Patented Jan. 15, 1952

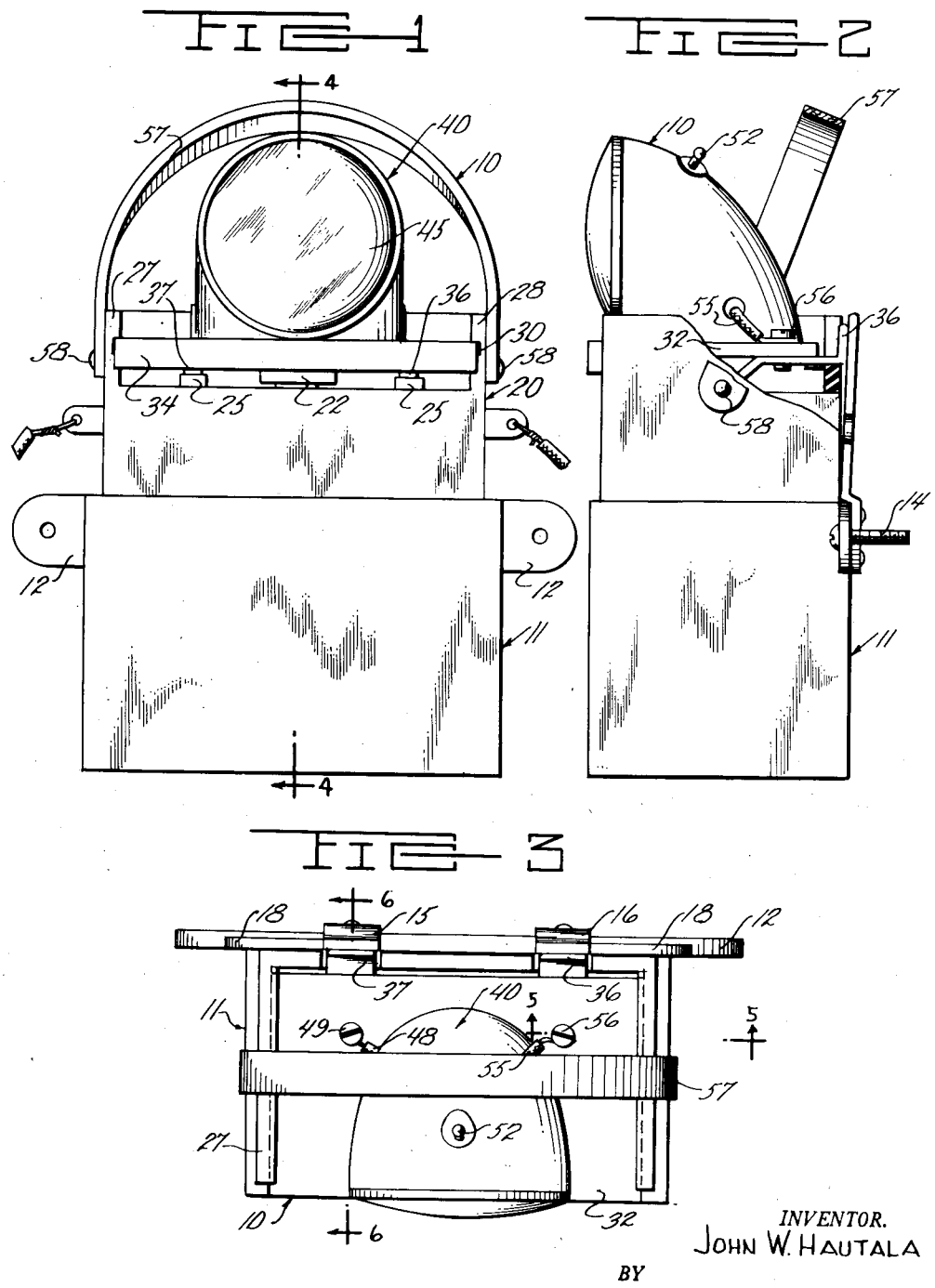

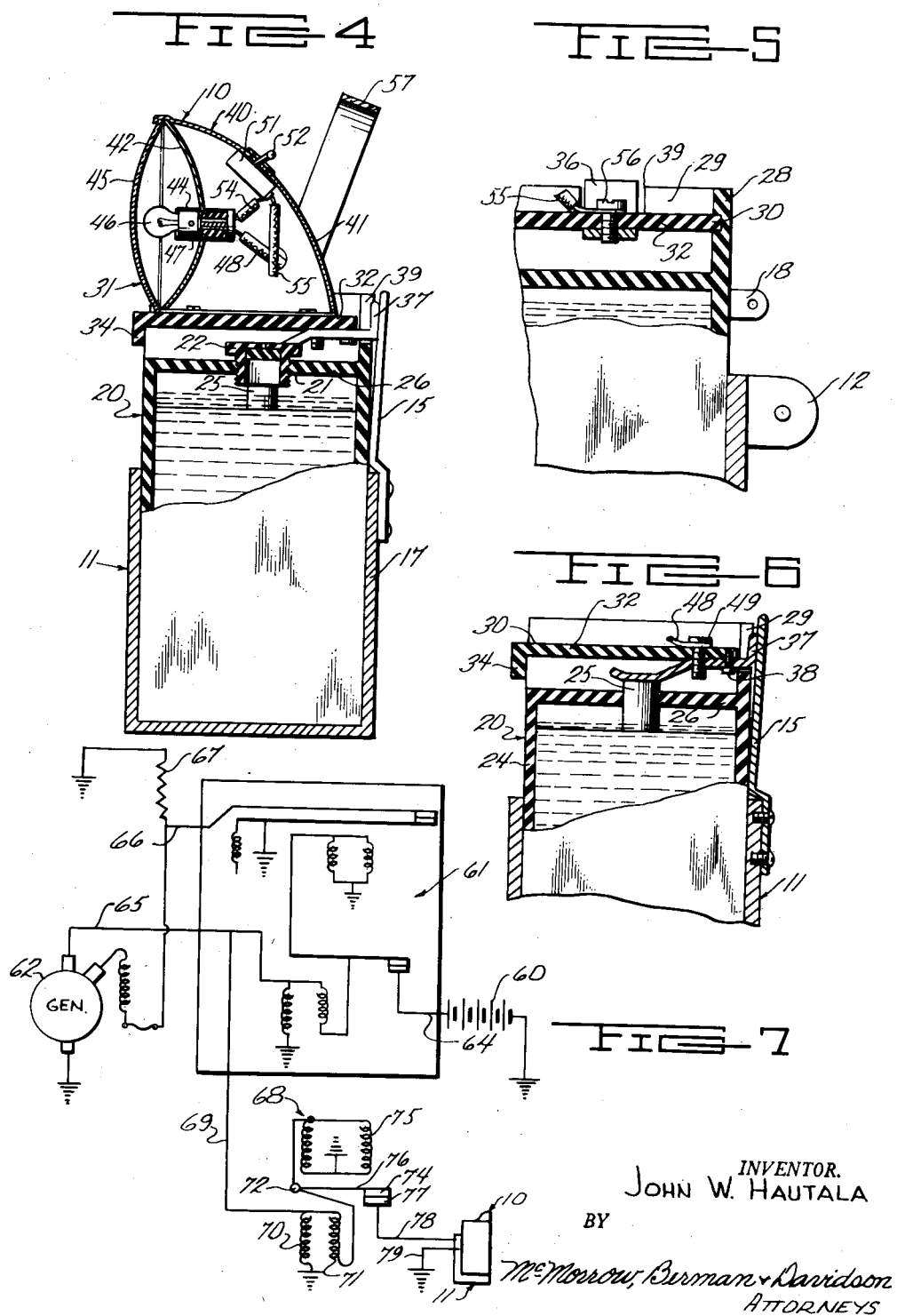

2,582,330

UNITED STATES PATENT OFFICE 2,582,330

PORTABLE ELECTRIC LIGHT WITH BATTERY CHARGING BRACKET

John W. Hautala, Canton, Ohio

Application February 8, 1949, Serial No. 75,173

1 Claim. (Cl. 240—10.6)

This invention relates to portable electric lamps, and more particularly to a wet-cell flashlight to be carried in an automobile or similar vehicle.

It is an object of this invention to provide a storage battery powered flashlight or trouble light to be mounted in an automobile in such a manner that during operation of the engine of the automobile the generator thereof will serve to charge the battery of this auxiliary light.

Another object of this invention is to provide a flashlight casing and receptacle for the casing having contacts which are engageable when the flashlight casing is supported in the receptacle or bracket for connecting the one-cell flashlight with the generator.

Still another object of this invention is to provide a wet-cell flashlight casing and a bracket for supporting the casing having readily separable contact members engageable while the casing is in the bracket for connecting the battery of the flashlight to the automobile generator, the contact members being so supported on the casing and bracket that the chance of inadvertently short-circuiting the flashlight or the generator is greatly minimized.

A further object of this invention is to provide a flashlight for use as a trouble light, the light having a one-cell casing formed with means for removably supporting an electric light bulb and lens casing in such a manner that the head, or light bulb and lens, may be readily removed from one battery and applied to another.

With the above and other objects in view, my invention consists in the arrangement, combination and details of construction disclosed in the drawings and specification, and then more particularly pointed out in the appended claim.

In the drawings:

Figure 1 is a front elevation of a trouble light constructed according to an embodiment of my invention;

Figure 2 is a side elevation, partly broken away and partly in section;

Figure 3 is a top plan view;

Figure 4 is a vertical transverse section taken on the line 4—4 of Figure 1;

Figure 5 is a fragmentary vertical longitudinal section, taken on the line 5—5 of Figure 3;

Figure 6 is a vertical transverse section, partly broken away, taken on the line 6—6 of Figure 3;

Figure 7 is a schematic wiring diagram showing the invention incorporated in the electrical system of a conventional automobile.

Referring to the drawings, the numeral 10 designates generally a flashlight or trouble light which is adapted to be carried about in an automobile, and to be charged by the generator of the automobile while it is seated in a bracket 11 fixed at a suitable and convenient location in the automobile, and connected to the generator.

The bracket 11 is formed of a rectangular box open at the top thereof and provided with a pair of outwardly-extending ears 12 which are adapted to be secured by bolts 14, or other suitable fastening means, to a desirable position in the automobile. A pair of upstanding contact arms 15 and 16 are fixed on the outside of the rear wall of the bracket 11 and extend upwardly beyond the upper edge of the bracket. The portions of the contact arms 15 and 16 above the bracket are forwardly offset and disposed substantially in alignment with the inner surface of the rear wall 17 of the bracket 11. Each of the contact arms 15 and 16 is formed with an integral, laterally-extending lug 18 for connection of an electrical lead which is ultimately connected to the generator of the automobile.

The trouble light 10 further comprises battery casing 20 formed of a suitable composition or other insulating material, substantially in the same manner as the casing of conventional automobile batteries. The casing 20 is substantially closed, but formed with a filler opening 21 in the upper wall thereof. A filler cap 22 threadably engages in the opening 21 for closing the casing 20 when it has been filled to the desired level with water. Plates 24 are supported within the casing 20 and connected to a pair of battery posts 25, which extend upwardly through the top wall 26 of the casing 20.

A flange 27 extends upwardly from one side wall of the casing 20 above the top wall 26 of the casing 20 and above the upper end of the battery posts 25. A similar flange 28 is formed on the opposite side wall of the battery casing 20 and the two flanges 27 and 28 are connected together by an upstanding flange 29 formed as an extension of the rear wall of the casing. The flanges 27, 28 and 29 may be fixed to, or preferably formed integrally with the casing 20. The flanges 27, 28 and 29 are formed with inwardly-facing grooves 30.

The head member 31 comprising a flat base plate 32 is formed of composition or other suitable insulating material having a substantial rigid characteristic. The base plate 32 is substantially rectanguler in configuration and its edges are slidably engageable in the groove 30 of the flanges 27, 28 and 29 so that the head 31 occupies a position over the upper end of the battery casing 20 and above the battery posts 25 which extend through the top wall 26 of the battery casing. A depending flange or lip 34 extends downwardly from the front edge of the plate 32 for closing the space between the top wall 26 of the casing 20 and the base plate 32.

A pair of contact fingers 36 and 37 are fixed on the bottom surface of the plate 32 for engagement with the battery posts 25. The contact fingers 36 and 37 are fixed on the bottom surface of the plate 32 by screws 38, or other suitable fastening means engaging their rear ends. The free forward ends of the contact fingers 36 and 37 are downwardly offset from the flat plate 32 for frictionally engaging the upper ends of the battery posts 25. The rear ends of the contact fingers 36 and 37 extend outwardly beyond the rear edge of the plate 32, and have vertical lugs rising therefrom and arranged for engagement with the contact arms 15 and 16 which are fixed on the bracket 11. The upwardly-extending flange 29 is formed with cut-out portions or recesses 39 through which the lugs of the contact fingers 36 and 37 extend.

A lamp housing 40 is fixed on the upper side of the base plate 32 and has an open front and a downwardly and rearwardly curved wall 41. A reflector 42 is secured in the open front of the housing 40 and a light bulb socket 44 is fixed in substantially the center of the reflector 42. A lens 45, which is convex in configuration, is secured in the open end of the housing 40 forwardly of the reflector 42. A light bulb 46 having a bayonet base 47 is engaged in the socket 44 for supporting the light bulb 46. One wire, as 48, extends through the housing 40 rearwardly of the reflector 42 and is connected at one end to the socket 44. The other end of the wire 48 is connected to one of the contact fingers, as the contact finger 37, by a screw 49, or other suitable conducting fastening means. A switch 51 is fixed on the inner surface of the rear wall 41 of the housing 40 and has a handle or lever 52 extending upwardly through an opening in the top of the housing 40. A wire 54 connects the other side of the socket to one of the terminals of the switch 51. A wire 55 extends through an opening in the rear wall 41, opposite from the opening for the wire 48, and a screw 56 secures the free end of the wire 55 to the base plate 32 and connects the wire to the contact finger 36 carried by the base plate.

When the base plate 32 is slid into the grooves 30 of the flanges 27 and 28, the downwardly-offset face ends of the contact fingers 36 and 37 engage on the upper ends of the battery posts 25. The circuit to the bulb 46 is completed through the switch 51, so that the operator may selectively turn the trouble light off and on.

A bail handle 57 is pivotally connected to the outer sides of the side walls of the battery casing by pivot pins 58. The handle 57 extends upwardly over the lamp housing 40 to provide a suitable handle or supporting strap for the trouble light 10.

In the use and operation of the trouble light 10, the bracket 11 is adapted to be fixed by fastening members engaging through the ears 12 to a suitable part of the automobile. The trouble light 10 is then seated in the bracket 11, whereby the free ends of the contact fingers 36 and 37 engage the battery posts 25 and the lugs on the fingers 36 and 37 engage the contact arms 15 and 16, which are carried by the bracket 11. When the battery casing 20 and lamp housing 40 are together removed from the bracket or receptacle 11, the battery will provide sufficient power for operating the bulb 46 for a considerable period of time. When the battery casing and lamp housing are engaged in the bracket 11, suitable circuit-connecting means are provided for charging the battery in the casing 20 from the power of the generator of the automobile.

In Figure 7 I have shown a circuit diagram for the conventional electrical system of an automobile, which consists of a battery 60, a voltage regulator 61 and a generator 62. The battery 60 is connected to the voltage regulator by a lead 64 and the other post of the battery 60 is grounded. A wire 65 connects the generator with the voltage regulator 61, and a wire 66 connects the voltage regulator to the other side of the generator and to the resistance circuit 67 of the automobile. In the use of my trouble light 10 and bracket 11 therefor, I have provided a separate voltage regulator 68 to be connected to the generator 62 independently of the voltage regulator 61 of the vehicle electrical circuit. A wire 69 is tapped into the wire 65 intermediate the length thereof. The other end of the wire 69 is connected to one end of the cutout relay voltage coil 70 of the voltage regulator 68 added for my trouble light 10. The other end of the coil 70 is grounded, and a cutout relay current coil 71 is connected to the wire 69 at substantially the same position that the first end of the coil 70 is connected. The other end of the cutout relay current coil 71 is connected to a post 72 which is connected to a breaker point 74. Voltage relay control coils 75 are also connected to the post 72 opposite from the coils 70 and 71. The breaker point 74 is formed on an armature 76 to be actuated by the coils 70, 71 and 75. A second breaker point 77 is operatively associated with the breaker point 74 for completing a charging circuit to the battery of my invention. A wire 78 connects the breaker point 77 to one terminal, 15 or 16, of the bracket 11, and another wire 79 connects the other terminal, 15 or 16, to a ground.

When the generator speed comes to normal, the proper voltage acts on the cutout voltage relay coil 70 which pulls the points 74 and 77 together. This completes the circuit to the trouble light 10 from the generator 62 for charging the battery of which the trouble light 10 is formed. When the battery reaches a maximum density, being fully charged, the trouble light 10 offers sufficient resistance to cause the current to flow to the voltage relay control coils which pull the contact points 74 and 77 apart. When the voltage of the trouble light 10 is greater than that of the generator, current from the battery flows to the cutout relay current coil 71 for initially opening the contact points 74 and 77.

I do not mean to confine myself to the exact details of construction herein disclosed, but claim all variations falling within the purview of the appended claim.

I claim:

In a portable lamp, a bracket comprising a rectangular housing having side walls and end walls and being open at its upper end and closed at its lower end, a pair of contact arms secured on one end wall of the bracket housing and projecting above the upper end of said one end wall, a rectangular insulated battery casing removably and conformably seated in said bracket housing, said battery casing having a closed upper end located on a level above the upper end of the bracket housing, a pair of battery posts mounted on and rising from the upper end of the battery casing, flange means on the upper part of the battery casing and rising above the closed upper end thereof, said flange means being limited to extend along the opposite side walls and the said one end wall of the battery casing, said flange means being formed on its laterally inward side with groove means, and a removable lamp head comprising a rectangular insulated base plate positioned over the upper end of the battery casing and having side edges slidably engaging said groove means, a pair of contact fingers on the under side of said base plate having free ends engaging the battery posts and other ends having lugs thereon engaging said contact arms, and a lamp housing fixed on the upper side of said base plate having a light bulb therein having terminals connected to said contact fingers.

JOHN W. HAUTALA.

REFERENCES CITED

The following references are of record in the file of this patent:

UNITED STATES PATENTS

| Number | Name | Date |
|---|---|---|
| 1,469,783 | Essington | Oct. 9, 1923 |
| 1,964,201 | Harsted | June 26, 1934 |
| 2,233,377 | Talbot | Feb. 25, 1941 |

FOREIGN PATENTS

| Number | Country | Date |
|---|---|---|
| 120,369 | Great Britain | (void spec. printed 1919) |